June 19, 1923.

G. A. SWANSON

BUILDING BLOCK

Filed March 13, 1919

Inventor
Gus A Swanson
Jones Addington Amesbury
Atty

June 19, 1923.
G. A. SWANSON
BUILDING BLOCK
Filed March 13, 1919
1,459,189
3 Sheets-Sheet 2
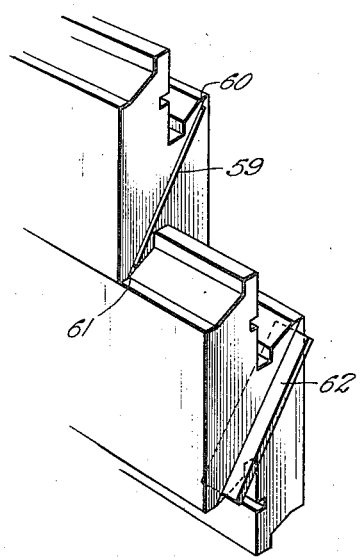
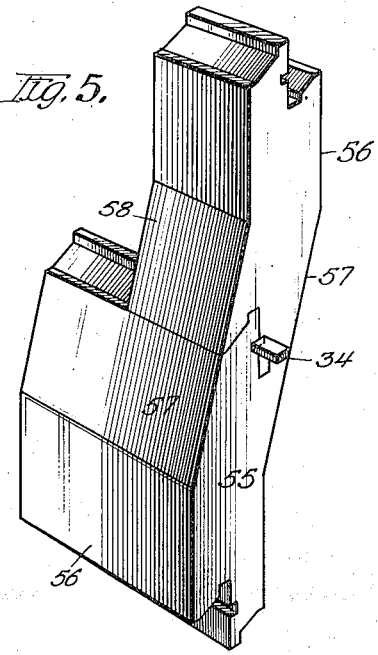
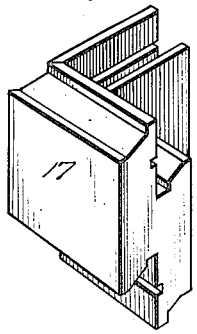
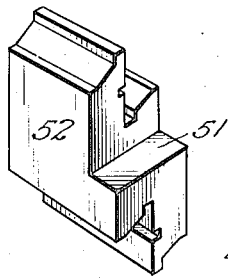
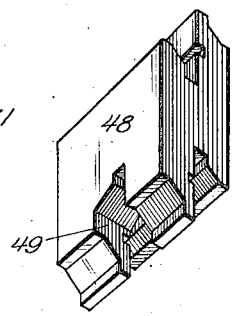
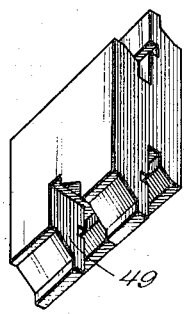

June 19, 1923.
G. A. SWANSON
BUILDING BLOCK
Filed March 13, 1919
1,459,189
3 Sheets-Sheet 3
Fig. 10.
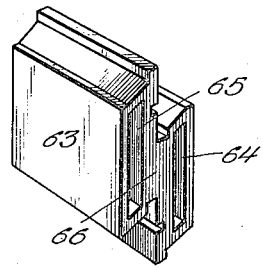
Fig. 11.
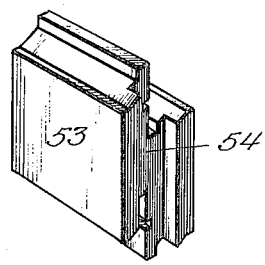
Fig. 12.
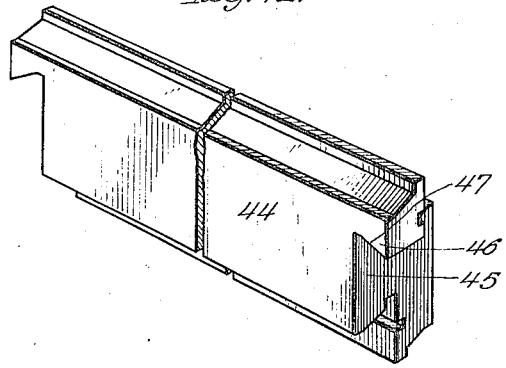
Fig. 13.
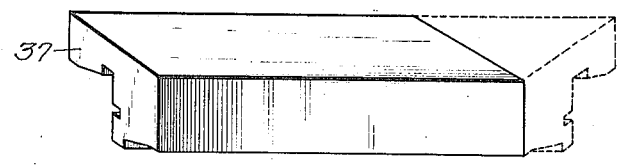
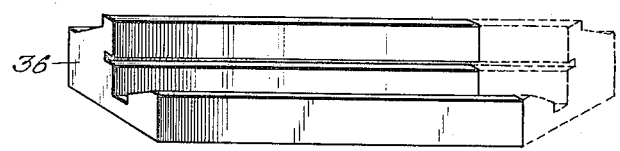
Inventor
Gus A Swanson
John Addington Anne Seibold
Atty Patented June 19, 1923.

1,459,189

UNITED STATES PATENT OFFICE.

GUSS A. SWANSON, OF CHICAGO, ILLINOIS.

BUILDING BLOCK.

Application filed March 13, 1919. Serial No. 282,316.

*To all whom it may concern:*

Be it known that I, GUSS A. SWANSON, a citizen of the United States, residing at Chicago, in the county of Cook and State of Illinois, have invented new and useful Improvements in Building Blocks, of which the following is a full, clear, concise, and exact description, reference being had to the accompanying drawing, forming a part of this specification.

My invention relates to improvements in building blocks and has for its object the production of a block that can be made of any desired size and of any desired material whereby structures of any desired character may be erected.

A further object is the production of blocks that are reversible and readily adapted for use in various positions.

A further object is the production of a block that can be economically made and placed in position with the least expenditure of time and money.

A further object is the production of a block which, when keyed with other blocks in operative position, forms a structure that maintains its shape against great pressure.

These and such other objects as may hereinafter appear are obtained by the use of my block, embodiments of which are illustrated in the accompanying drawings, in which—

Fig. 4 represents a perspective view of two blocks with a diagonal key, in position.

Fig. 5 shows a perspective view of a block construction showing a knee or inset block.

Fig. 6 represents a perspective view of a corner block.

Fig. 7 represents a perspective view of a window ledge block.

Fig. 8 represents a perspective view of a left hand block adapted for use in constructing partitions.

Fig. 9 shows a perspective view of a right hand block similar to that shown in Figure 10.

Fig. 10 represents a perspective view of a hollow concrete block embodying the principles of my invention.

Fig. 11 represents a perspective view of my improved block adapted to receive window or other frames.

Fig. 12 represents a perspective view of a form of block adapted for use in connecting a partition to a wall.

Fig. 13 represents perspective views of my improved block adapted for use as caps and sills.

Like numerals of reference indicate like parts in the several figures of the drawing.

Referring now to the drawings—

Figure 1:
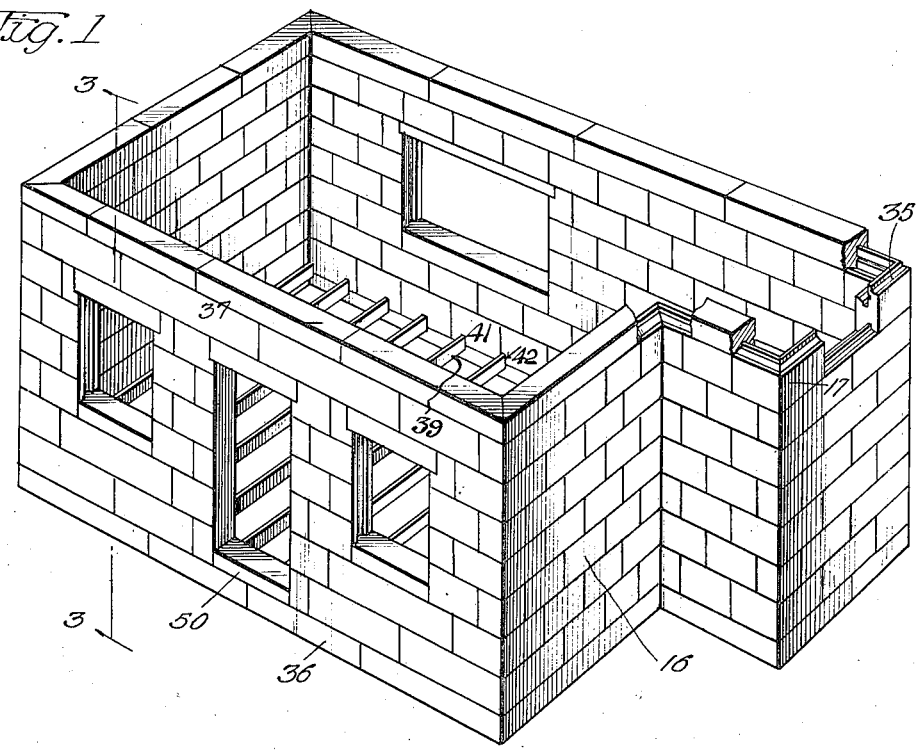
Fig. 1 represents a perspective view of a portion of a structure erected from my improved blocks.

16 represents the ordinary preferred form of block that is generally used in construction utilizing the principles of my invention. All of the other blocks hereinafter described are adaptations from or modifications of this block formed by either adding to or taking away some part thereof or by adapting it for some particular use in some particular place.

The block is substantially rectangular in form with flat sides, 17 and 18, and the upper and lower surfaces cut in moulding style with reversed symmetrical contour. The contour of the upper face, for instance, shows a groove or channel, 19, extending lengthwise along the center of the block, one face 20, of which extends partway upwardly parallel to the side 18, then inclined diagonally upward as shown at 21, terminating in a flat ledge or surface 22. The other side, 23, of the groove or channel, extends upwardly above the level of the flat surface 22, to the top of the block and forms one side of a projecting tongue or bead 24, having a flat upper surface 25. This bead on its face opposite the wall 23 has a vertical side 26, parallel to the side 23, extending downwardly a short way, from which an inclined shoulder or surface 27, extends to near the outside of the block and ends in a flat ledge or surface 28. It will be noted that the sides 21 and 27, and 22 and 28 are parallel to each other.

The opposite end of the block is of such a shape as will exactly match the contour of the upper surface. That is formed with a downwardly projecting bead or tongue 29, adapted to fit within the channel or groove 19, in an adjacent block and with a lower channel or groove 30, adapted to receive the tongue bead 24, of the adjacent block; the sloping sides of the lower face are parallel with and adapted to engage the sloping sides of the upper face of the adjacent block, when the block is turned to occupy an opposite position.

Figure 3:
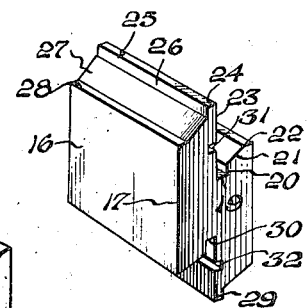
Fig. 3 is a perspective view of a solid block embodying my invention.

The side 23, of the upper channel, is provided with a horizontal channel or key way 31, and the corresponding vertical side of the lower channel 30 is also provided with a similar key way 32. Each of the blocks are provided with these channels and they are so placed as will be noted by referring to 33, Figure 3, that they occupy slightly staggered relations with respect to each other, so when a key or wedge member 34, is fitted within the two channels, the blocks are tightly forced together and securely locked in position.

By the use of this construction, walls may be quickly and readily erected of any desired height and held securely in position without the use of any cement or binding material. The uniform configuration of the upper and lower surfaces make it possible to build a block structure of any desired strength or magnitude.

In connection with these rectangular blocks 16, just described, I also provide corner blocks 17, the upper and lower surfaces of which correspond exactly with the surfaces of the standard block 16, heretofore described. The fact that the upper and lower surfaces of these blocks are exactly similar makes it possible to use the corner block 17, as shown at Figure 6, in a reversed position as shown in Figure 1, at 35, the blocks being exactly similar except being turned over; the upper surface of the block 17, for instance, becoming the lower surface of the block 35.

In erecting a building, a sill member 36, is used which, as shown in Figure 13, is simply half of a block similar to 16, cut horizontally. In the same manner, the cap, 37, illustrated in Figure 13, is the same block as 36, turned up side down—that is, the opposite half of a block similar to 16.

In buildings, floor joists, of course, are necessary and these are shown at 39, one end being notched forming a hook, the notched surface fitting over the upper surface 21, in the block 16. In order to lock these joists in position, a certain number of the ordinary blocks as 41, are cut away or channeled as shown at 42, providing a groove or channel for the hooked end 43 of the joists. When the building is finished it will be noted that the floor joists are securely locked in position without the use of any wedging or cementing.

Figure 2:
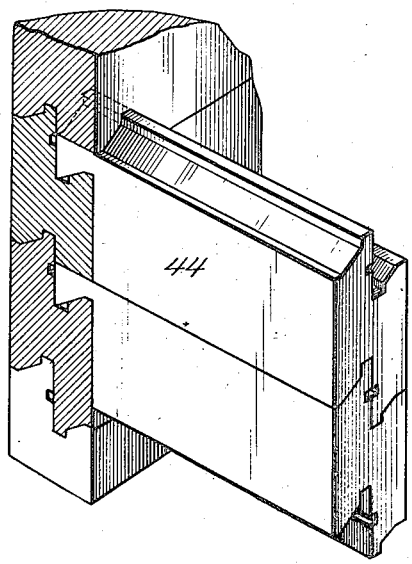
Fig. 2 represents a perspective view of a portion of a structure showing my partition block in operative position.

In building up inside partitions, a block 44 shown in Figure 2, is used which so far as its upper and lower configurations are concerned, is the same as the standard block 16, the only difference being that at the end the lower portion is cut away as shown at 45 leaving a downwardly projecting hooked ear 46, the diagonally extending under surface 47, being of the same angle as, and adapted to conform to, the sloping side 21 of the adjacent standard block.

In order to lock these partition blocks securely in place, some of the standard blocks are cut away forming blocks 48, as shown in Figures 8 and 9. The channels 49, in these blocks having upper surfaces conforming in contour to the upper surface of the standard block, so when the partition is in place the hooked ear 46 is contained within the channel 49, of the blocks 48, thus positively locking the partition in place against horizontal or vertical movement.

The sill members 50, adapted for doors and windows are practically the same as the sill member 36, except the ends may be cut off permitting them to rest on a ledge 51, cut out of a standard block 52, shown in Figure 7. In order to provide for proper insertion of window weights, sash and door casings, I find it advantageous to form standard blocks 53 with vertical channels in their end as shown at 54, thus leaving space for the insertion of any desired mechanism or members.

In case it is desired to erect a building buttress fashion or stepped back, as shown in Figure 5, a style of block 55 is provided, as shown in Figure 5; this block has inclined or knee shaped faces 57 so that after one of these blocks 55 is put in place and the building extended above these courses, the wall itself, will be set back the desired amount giving the buttress effect as shown at 58.

In order that a building may be quickly erected and taken down, I show in Figure 4, a modified form of block in which a diagonal channel 59 is provided in each end extending from the upper flat surface at 60, to the lower flat surface at 61. These channels on the opposite ends correspond permitting the insertion of a diagonally extending wedge 62 or, if it is desired to have the building remain permanent, cement may be poured in the channel in place of using the wedge 62.

It will be noted that in constructions using my improved blocks there is absolutely no chance for water to be carried into the building as from the center of the block outward the surfaces are all either horizontal or slope downward. Also, in this last construction, any water that may have been forced between the blocks would strike the wedges 62 and drain down and out. This construction is also practically wind proof.

These blocks of course may be formed of any desired material—wood, cement, clay or concrete, or any other material. In Figure 10, I have shown a block 63, with interior channels 64 and 65. That is to say, a hollow block formed with an interior rib 66. It will be noted that these channels occupy staggered positions with respect to each other and form a series of continuous horizontal air spaces extending entirely around the building. This form of construction prevents the dampness or odors from coming up between the walls as there is no empty space extending vertically from top to bottom but all air spaces extend horizontally and are not vertically intercommunicating.

As my improved blocks may be made in any size, it is evident that they are particularly adapted for either industrial or educational purposes. In the smaller form, they are very valuable as toys, or playthings, or may be used more seriously in kindergarten and manual training work to teach architecture and methods of building.

As an educational device, the blocks may be of larger size almost full size, if desired, and structures of all kinds may be erected in a room or on a platform showing all forms of construction.

Used industrially, of course, the blocks are of any desired size; in one sense, the larger the better and buildings of any description can be readily and quickly erected. Take, for instance, garages or additions, and summer cottages; it is a very simple matter to provide a supply of different forms of blocks and erect any sized building with or without the use of keys which will remain firmly in position as long as desired. In the ordinary form of construction, the keys are forced in horizontally as shown in Figure 5, thereby locking the blocks together and absolutely preventing any vertical or horizontal movement when the structure is complete. The structure, however, may be disassembled by removing the last key block and then slipping the blocks one on the other horizontally.

It is clear that there are multitudes of uses to which my improved invention can be put and that there are other forms that may be utilized without departing from the spirit of my invention.

I claim—

1. A building block formed with two parallel sides and two suitable ends, the upper and lower edges of said sides being formed of oppositely disposed symmetrical configurations each of said edges including an angular channel having vertical walls and a bead adapted to enter and engage the corresponding channel of the vertically adjacent block.

2. A building block formed with two parallel sides and two suitable ends, the upper and lower edges of said sides being formed of oppositely disposed symmetrical configurations each of said edges including an angular channel having vertical walls and a bead adapted to enter and engage the corresponding channel of the vertically adjacent block, the outer extremity of a portion of said bead being inclined with respect to the plane of said sides and substantially parallel with a portion of one of the surfaces adjacent said channel.

3. A building block formed with two parallel sides and two suitable ends, the upper and lower edges of said sides being formed of oppositely disposed symmetrical configurations each of said edges including an angular channel having vertical walls and a bead adapted to enter and engage the corresponding channel of the vertically adjacent block, one of said vertical walls being common to both tongue and groove.

4. A building block formed with two parallel sides and two suitable ends, the upper and lower edges of said sides being formed of oppositely disposed symmetrical configurations each of said edges including an angular channel having vertical walls and a bead adapted to enter and engage the corresponding channel of the vertically adjacent block, the outer extremity of a portion of said bead being inclined with respect to the plane of said sides and substantially parallel with a portion of one of the surfaces adjacent said channel, one of said vertical walls being common to both tongue and groove.

5. A building block having oppositely disposed symmetrical upper and lower edges having a tongue, a groove, a long vertical wall common to both members, short vertical wall opposite said long wall and inclined parallel surfaces extending from the termination of said short walls.

6. A building block having oppositely disposed symmetrical upper and lower edges having a tongue, a groove, a long vertical wall common to both members, short vertical wall opposite said long wall, inclined parallel surfaces extending from the termination of said short walls, and terminating in plane surfaces at right angles to said vertical walls and extending to the outer surfaces of said blocks.

7. A building block formed with two parallel sides and two suitable ends, the upper and lower edges being formed of oppositely disposed symmetrical configurations each of said edges including an angular channel having vertical walls, one of said walls being provided with a horizontal key-way, and a bead adapted to enter and engage the corresponding channel of the vertically adjacent block.

8. A building block having oppositely disposed symmetrical upper and lower edges having a tongue, a groove, a long vertical wall common to both members, and provided with a horizontal key-way, short vertical wall opposite said long wall and inclined parallel surfaces extending from the termination of said short walls.

9. A building block formed with two parallel sides and two suitable ends, the upper and lower edges of said sides being formed of oppositely disposed symmetrical configurations each of said edges including an angular channel having vertical walls, one of said walls being provided with a horizontal key-way, and a bead adapted to enter and engage the corresponding channel of the vertically adjacent block, the key-ways in the abutting edges of adjacent blocks being slightly staggered so that the insertion of a key within the channel so formed will draw the abutting edges tightly together.

10. A building block having oppositely disposed symmetrical upper and lower edges having a tongue, a groove, a long vertical wall common to both members, and provided with a horizontal key-way, short vertical wall opposite said long wall and inclined parallel surfaces extending from the termination of said short walls, the key-ways in the abutting edges of adjacent blocks being slightly staggered so that the insertion of a key within the channel so formed will draw the abutting edges tightly together.

11. A whole building block formed with two parallel sides and two parallel ends, the upper and lower edges of said sides being formed of oppositely disposed symmetrical configurations each of said edges including an angular channel having vertical walls and a bead adapted to enter and engage the corresponding channel of the vertically adjacent block.

12. A whole building block formed with two parallel sides and two suitable ends, the upper and lower edges of said sides being formed of oppositely disposed symmetrical configurations each of said edges including an angular channel having vertical walls and a bead adapted to enter and engage the corresponding channel of the vertically adjacent block, said block having two interior passages extending horizontally thereto and occupying staggered relations to each other and with a vertical wall therebetween.

13. A building block formed with two parallel sides the upper and lower edges of said sides being formed of oppositely disposed symmetrical configurations each of said edges including an angular channel having vertical walls and a bead adapted to enter and engage the corresponding channel of the vertically adjacent block.

14. A building block having symmetrical interlocking edges, each edge including a longitudinal tongue and longitudinal groove positioned so that on two contiguous edges of adjacent blocks the tongue of each block fits into the groove of the other, said tongues and grooves being shaped to prevent relative transverse movement of interlocked blocks.

15. A building block having symmetrical interlocking edges, each edge including a longitudinal tongue and longitudinal groove positioned so that on two contiguous edges of adjacent blocks the tongue of each block fits into the groove of the other, said tongues and grooves being shaped to prevent relative transverse movement of inter-locked blocks, and a key to prevent separation of interlocked blocks.

16. A building block having oppositely disposed symmetrical inter-locking upper and lower edges, each edge including a longitudinal tongue and a longitudinal groove positioned so that on two contiguous edges of adjacent blocks the tongue of each block fits into the groove of the other, said tongues and grooves being shaped to prevent relative transverse movement of interlocked blocks, and said oppositely disposed edges permitting interlocking of the blocks with either edge up or down.

17. A building block having oppositely disposed symmetrical inter-locking upper and lower edges each edge including a longitudinal tongue and a longitudinal groove positioned so that on two contiguous edges of adjacent blocks the tongue of each block fits into the groove of the other, said tongues and grooves being shaped to prevent relative transverse movement of inter-locked blocks, and said oppositely disposed edges permitting interlocking of the blocks with either edge up or down, and a key to prevent separation of inter-locked blocks.

In witness whereof, I have hereunto subscribed my name.

GUSS A. SWANSON.